A. PERRIN.
SIGHT FOR FIREARMS.
APPLICATION FILED APR. 26, 1921.

1,428,115.

Patented Sept. 5, 1922.

Inventor
Arthur Perrin
by Joseph P. Livermore
Att'y

Patented Sept. 5, 1922.

1,428,115

UNITED STATES PATENT OFFICE.

ARTHUR PERRIN, OF BROOKLINE, MASSACHUSETTS.

SIGHT FOR FIREARMS.

Application filed April 26, 1921. Serial No. 464,511.

*To all whom it may concern:*

Be it known that I, ARTHUR PERRIN, a citizen of the United States, and a resident of Brookline, in the county of Norfolk and State of Massachusetts, have invented an Improvement in Sights for Firearms, of which the following description, in connection with the accompanying drawing, is a specification, like reference characters on the drawing designating like parts.

This invention relates to a sight for firearms and has for its object to provide a sight having some of the advantages of the usual telescopic sights, but being much less costly, and also being better adapted for offhand shooting and in general for hunting or for field use.

It is known that a simple convex lens of very slight convexity, that is, of great focal length relative to its diameter, will produce at or near its focus a slightly magnified image of a distant object, and in accordance with the present invention such a simple convex lens is used as the foresight in conjuction with a peep sight of any usual or suitable construction as the rear sight.

As the proper distance from the eye of a lens suitable for this purpose may be less than the length of the rifle barrel on which it is to be used as a sight, and inasmuch as the lens will commonly require adjustment for the eyes of different users and for different distances of the object sighted, the lens is, in accordance with this invention, combined with a support or mounting adapted to be adjusted in position lengthwise of the barrel, and to be securely fixed thereon at the proper distance from the peep sight at the rear to produce a clear image to the eye of the user when looking through the said peep sight.

A fore sight of this character will commonly magnify about two diameters, or it may be a little more or less, and thus the apparent distance of the object is reduced to about one half the actual distance, which will be of great benefit in shooting, without the disadvantage of the greatly reduced field of vision, and the greatly magnified apparent movement of the object in the unsteadiness or wabble of the gun, which are experienced in the use of telescopic sights of usual construction.

Figure 1:
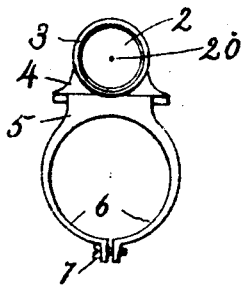
Fig. 1 is a rear elevation of a sight for firearms embodying this invention.
Figure 2:
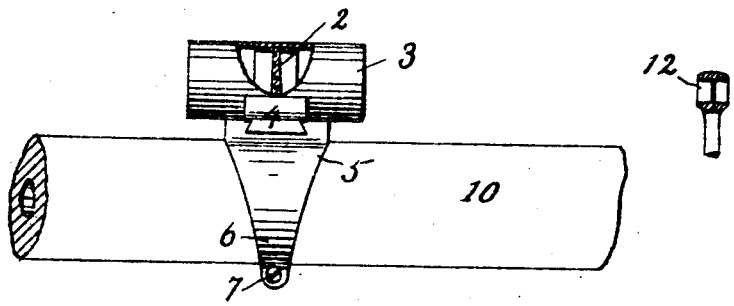
Fig. 2 is a side elevation thereof, partly in section, showing also a portion of the gun barrel to which it is secured and the rear peep sight used in conjunction therewith.
Figure 3:
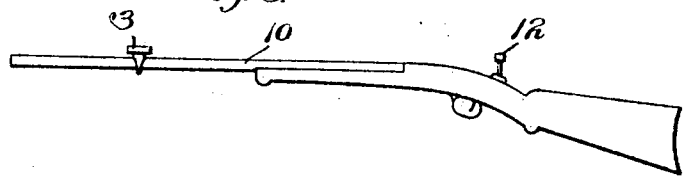
Fig. 3 a side view of a shoulder firearm illustrating the application thereto of the sighting means forming the subject of this invention.

The foresight comprises a convex lens 2 of small diameter which, to meet the optical requirements is of a very small degree of convexity, giving an amplification in the neighborhood of two diameters.

The said lens 2 contained in a short tube 3 is affixed to a support 4 preferably detachably connected with the holder 5 as by a dovetail engagement providing for transverse adjustment on the holder.

In order to provide for adjustment of the sight on the gun barrel 10 so as to focus properly for the eye of any user looking through the peep sight 12 at the rear, the holder 5 comprises or is provided with clamp arms 6 adapted to embrace the barrel 10 and capable of sliding lengthwise thereof, but adapted to be held fast when once properly adjusted as by tightening the screw 7.

The lens 2 is provided with a small mark 20 at its centre to establish, with the hole of the peep sight 12, the line of vision or to cover the point to be hit when the gun is properly aimed.

The above described sight is much less costly and more easily applied to the gun than the usual telescopic sights, but it possesses to a degree the advantages of reducing the apparent distance of the object aimed at, rendering it more distinctly visible, and amplifying the deviation from correct aim, while retaining the advantage of an unobstructed field of vision around the vicinity of the magnified object, or magnified portion of an object, as seen through the lens.

In short the properties of the sight forming the subject of this invention are such as to render it of decided help in off-hand shooting, while the usual telescopic sights commonly require the use of a rest to render their properties effectively available to the user.

The rear sight, besides performing the usual rear sight function of determining a second point in the line of aim, also co-operates optically with the foresight and greatly enhances the sharpness of the magnified image, the rear peep sight being in effect a diaphragm with a minute perforation or aperture interposed between the lens of the foresight and the lens of the eye of the user.

While the sighting means have been described as for firearms it is obvious that they may be employed for other analogous uses, as for example in connection with some kinds of range finding appliances and the term barrel is to be understood as including any instrumentality to which the sights can be applied as herein described, for analogous use in connection therewith.

I claim:

1. A foresight for firearms and the like comprising in combination with the barrel and with a suitable rear sight, a convex lens and holder therefor mounted on said barrel and adapted to be moved lengthwise thereof for adjustment of distance from said rear sight.

2. A sight for firearms consisting of a convex lens of small convexity combined with the barrel and with a holder for said lens adapted to have a sliding movement lengthwise of the gun barrel and to be held fast when adjusted to the proper position on the gun barrel.

3. A sighting means for firearms and the like comprising in combination with the barrel, a rear sight consisting of a diaphragm having a minute perforation, and a convex lens adjustable longitudinally of the barrel.

ARTHUR PERRIN.